United States Patent [19]

Fuhr et al.

[11] Patent Number: 4,632,951
[45] Date of Patent: Dec. 30, 1986

[54] METAL OXIDES ON ORGANIC, HALOGEN-CONTAINING CARRIERS AS FLAMEPROOFING AGENTS

[75] Inventors: Karl Fuhr, Krefeld; Friedemann Müller, Neuss; Theobald Eicher, Dormagen, all of Fed. Rep. of Germany

[73] Assignee: Bayer Aktiengesellschaft, Leverkusen, Fed. Rep. of Germany

[21] Appl. No.: 746,590

[22] Filed: Jun. 19, 1985

[30] Foreign Application Priority Data

Jun. 30, 1984 [DE] Fed. Rep. of Germany ....... 3424147

[51] Int. Cl.$^4$ ............... C08K 9/02; C08K 3/20; C09D 3/48; C08L 23/00
[52] U.S. Cl. ................. 524/204; 106/18.25; 427/212; 428/403
[58] Field of Search .................. 106/18.25; 427/212; 428/403; 523/204

[56] References Cited

U.S. PATENT DOCUMENTS

| | | | |
|---|---|---|---|
| 2,610,920 | 9/1953 | Hopkinson | 106/18.26 |
| 3,715,310 | 2/1973 | Butcher | 106/18.26 |
| 4,240,956 | 12/1980 | Weil et al. | 524/382 |
| 4,287,309 | 9/1981 | Cobbledick | 521/114 |
| 4,525,516 | 6/1985 | Garcia | 525/380 |

FOREIGN PATENT DOCUMENTS

| | | | |
|---|---|---|---|
| 587288 | 11/1959 | Canada | 106/18.25 |
| 7117180 | 6/1972 | Netherlands | 106/18.25 |

*Primary Examiner*—Herbert J. Lilling
*Attorney, Agent, or Firm*—Connolly and Hutz

[57] ABSTRACT

Flameproofing additives for plastics materials consisting of a coating- and carrier material. The coating consists of metal oxides, the carrier of organic compounds, in which halogen is bound to carbon. The combination of the two components of the flameproofing additives has an inhibiting action on the fire and gives plastics materials an effective fire protection according to the invention, for example, V-2 to V-0 according to UL 94.

8 Claims, No Drawings

METAL OXIDES ON ORGANIC, HALOGEN-CONTAINING CARRIERS AS FLAMEPROOFING AGENTS

This invention relates to novel flameproofing additives for plastics materials. These flame proofing agents consist of a coating- and of a carrier material. The coating consists of metal oxides, the carrier of organic compounds, in which halogen is bound to carbon. The combination of the two components of the flameproofing additives has an inhibiting action on the fire and gives plastics materials an effective fire protection according to the invention, for example, V-2 to V-0 according to UL 94.

The plastics materials can thereby contain further additives, also those which influence the course of the fire, such as the same or different metal-, halogen- and/or phosphorus compounds.

It is known to add halogen-containing flameproofing agents, particularly organic bromine- and/or chlorine compounds, to plastics materials to reduce the combustibility thereof, together with synergetically-active metal oxides, for reasons of effectiveness and economy, predominantly antimony(III)-oxide. However, up to 10% by weight of a metal oxide is required for sufficient effects, particularly with metal oxides which are less effective than antimony(III)-oxide, for example, tin-(IV)-oxide and bismuth(III)-oxide, in order to achieve fire classification V-2 to V-0 according to UL 94. Experience shows, however, that these large quantities worsen the mechanical properties of the plastic materials.

It has surprisingly been found that relatively small quantities of various metal oxides, even those which have so far only been attributed with low effectiveness, have a high effectiveness as flameproofing agents when they are deposited on organic, halogen-containing compounds in a finely-divided manner and then incorporated into plastics materials.

Antimony(III)-oxide, lead(IV)-oxide, cerium(IV)-oxide, copper(II)-oxide, molybdenum(VI)-oxide, vanadium(V)-oxide, bismuth(III)-oxide, tungsten(VI)-oxide, tin(IV)-oxide and zirconium(IV)-oxide, as well as mixtures thereof, are used, for example, as metal oxides which are highly active in this form.

Oxides of metals are thus predominantly used, which are in the fourth and fifth main group and the fourth to the sixth sub group of the Periodic Table of the Elements. A fire protection is obtained on organic, halogen-containing compounds as carriers with these as coating material, which, for example, corresponds in ABS-plastics materials to the assessment V-2 or V-0 according to the UL 94 method.

A particular advantage of the invention is that by using the organic halogen compounds, which are indispensible for an effective fire protection, as carriers for the metal oxide, in principle no additional foreign material is required to be added to the plastics material.

An object of the invention are thus preparations suitable as flameproofing agents, which are obtained by depositing water-containing metal oxide on an organic, halogen-containing carrier material, washing out adhesive electrolytes and subsequent heating, as well as the use thereof in plastics materials.

Metal oxide-containing preparations are thus used, which act as flameproofing additives for plastics materials and are characterised in that the metal oxide in a quantity of from 2 to 20% by weight, based on the total quantity, acts as a surface covering on an organic, halogen-containing compound as carrier material.

The content of a plastics material (total mixture) provided with this preparation, is from 3 to 25% by weight in this preparation. The preparation according to the invention thus contains at least a portion of the necessary halogen-containing flameproofing agent. The quantity thereof thereby corresponds to the usual quantity, that is the content of halogen, based on the plastics material (total mixture), is from about 10 to 20% by weight. Principally organic compounds with carbon-bound halogen atoms, predominantly chlorine and bromine, are useful as carriers for the metal oxide preparation, which compounds are inert in relation to the plastics material, do not dissolve in water and have a melting point greater than 100° C. Halogen-containing compounds, as already used for a long time in plastics materials for flame protection are suitable.

Examples of these are chlorinated paraffins and brominated cycloaliphatic compounds as well as chlorinated and brominated derivatives of benzene, alkylbenzenes, diphenylene, diphenyl ether, diphenyl methane, bisphenoxyethers and bisphthalimides, moreover reaction products of chlorine- and bromine-containing difunctional compounds such as hexachloroendomethylene-tetrahydrophthalic acid, tetrachloro- or tetrabromo phthalic acid and tetrachloro- or tetrabromobisphenol A with monofunctional compounds such as alcohols, phenols and amines, which again can contain halogen atoms, such as hexabromocyclododecane, hexachlorobenzene, hexabromobenzene, pentabromotoluene, pentabromoethylbenzene, octa- and decabromodiphenyl, hexabromo- to decabromodiphenylether, hexabromo-bis-phenoxyethane, ethylene-bis-tetrabromophthalimide and the bis(dibromopropyl)ether of the tetrabromobisphenol A and mixtures thereof.

These materials should be present in a finely-divided manner with a grain size of from 1 to 50 μm. For the production of the preparation, the carrier material is effectively suspended in a liquid in which it does not dissolve, advantageously in water.

The metals are added as a compound in an acidic solution, for example, as chlorides, in the form of an aqueous-hydrochloric acid solution. By neutralizing with a base, more or less water-containing metal oxides are deposited on the carrier. Ammonia solution, potassium hydroxide solution and sodium hydroxide solution or alkali carbonate solutions are used in usual concentrations for neutralization. Neutralization should not be carried out too fast, as otherwise the danger of incomplete hydrolysis of the salts exists. After some time with possibly necessary corrections of the pH, the solids material is filtered off, washed in an electrolyte-free manner, dried and heated. The acidic solutions and the aqueous solution of the base can also be added simultaneously while maintaining the pH which is favourable for precipitation.

An object of the invention are also thermoplastic plastics materials, which contain the preparations according to the invention as flameproofing agents in the given concentrations.

Particularly suitable are thermoplasts such as polystyrene, co- and graft polymers with styrene, for example, styrene/acrylonitrile-copolymers, polystyrene with high resistance to impact, graft polymers of styrene, acrylonitrile and rubbers (of the ABS type), polyethylene, polypropylene, polyvinyl chloride, polyacrylate, polyester, aromatic polycarbonate, polyamide, polyurethane, polysulphone, polyphenylene oxide, polyphenylene sulphide or also mixtures thereof, as well as duroplastic plastics materials, for example of unsaturated polyester resins, epoxide resins and cross-linkable raw materials for polyurethanes.

These plastics materials can also contain—in addition to the flameproofing agents according to the invention and further flameproofing agents, (including halogen-containing agents)—additives such as fillers, pigments, and glass fibres and/or typical and necessary auxiliaries, for example heat stabilizers, light protecting agents, antioxidants, lubricating and greasing materials, mould release agents and dyes. Phosphorus compounds are used as further flameproofing agents, such as triphenyl phosphates, diphenyl cresylphosphate, methane diphenylphosphonate and triphenyl phosphite. The quantities are in the usual ranges.

Examples of typical fillers and pigments are glass balls, quartz powder, lime, chalk, light and heavy spar, aluminium hydroxide, aluminium oxide, magnesium- and aluminium silicates such as mica, talcum or kaolin, aluminium phosphate, calcium phosphate, zinc borate, zinc oxide, iron oxide, titanium dioxide, carbon, for example as graphite or carbon black, as well as fibrous materials, such as glass fibres.

EXAMPLE 1

200.0 g of decabromodiphenylether (particle size <10 μm) are added to 0.5 l of water. The suspension heated to 60° C. is thereupon simultaneously mixed in 1 h with a solution of 23.9 g of antimony(III)-oxide in a mixture of 21.1 g of water and 64.7 g of concentrated hydrochloric acid (37%) as well as the solution of 42.4 g of ammonium carbonate and 240.3 g of water, in a manner such that the pH of 7.0 remains unchanged.

The subsequent reaction time while controlling the pH of 7.0 is 2 h. After cooling the solids material are filtered off and removed by suspending 3 times in 1 l of water and by filtering off the sodium chloride obtained by neutralization. The product is firstly dried for 15 h at 50° C., then a 5 h long treatment at 250° C. takes place (in each case in a vacuum drying chamber), in order to remove the remaining water.

The antimony content of the finished preparation is analytically determined at 9.2%. It is predominantly in the form of antimony(III)-oxide on the surface of the decabromodiphenylether.

In order to test the flameproofing effect of the above-described carrier preparation, 218.3 g are incorporated in 1081.7 g of a typical ABS copolymer (Novodur PX by Bayer AG) on a kneading machine at from 200° to 220° C. The material obtained is then processed to suitable test samples, 2.5 mm thick, for the UL 94 test. It contains 1.5% of antimony in the form of oxide and 12.5% of diphenylether-bound bromine. The UL 94 test gives the test result V-0.

EXAMPLE 2

200.0 g of octabromodiphenylether (particle size <100 μm) are added to 0.4 l of water. The suspension heated to 80° C. is thereupon simultaneously mixed in 1 h with a solution of 20.0 g of antimony(III)-chloride in a mixture of 17.6 g of water and 53.9 g of concentrated hydrochloric acid (37%) such that the pH of 7.0 remains unchanged. The subsequent reaction and working-up take place as in Example 1, only the subsequent drying takes place for 5 h at 150° C.

The antimony content of the finished preparation is analytically determined at 7.1%. It is predominantly present as antimony(III)-oxide on the surface of the octabromodiphenylether.

In order to test the flameproofing effect of the above-described carrier preparation, 257.4 g are incorporated in 1042.6 g of a typical ABS copolymer (Novodur PX) on a kneading machine at from 200° to 220° C. and processed to test samples, 2.5 mm thick. The material contains 1.4% of antimony in the form of oxide and 14.5% of diphenylether-bound bromine. The UL 94 test gives the test result V-0.

EXAMPLE 3

200.0 g of decabromodiphenylether (particle size <10 μm) are added to 0.5 l of water. The suspension heated to 80° C. is thereupon simultaneously mixed in 1 h with a solution of 58.6 g of tin(IV)-chloride in a mixture of 116.6 ml of water and 25.2 g of concentrated hydrochloric acid (37%) as well as 144.7 g of sodium hydroxide solution (32%) such that the pH of 4 remains unchanged. The subsequent reaction (with a pH of 4.5) and working-up take place as in Example 1.

The tin content of the finished preparation is determined at 11.3%. It is predominantly present as tin(IV)-oxide on the surface of the decabromodiphenylether.

In order to test the flameproofing effect of the above-described carrier preparation, 90.5 g plus 117.5 g of decabromodiphenylether are incorporated in 1092 g of a typical ABS copolymer (Novodur PX) on a kneading machine at from 200° to 220° C. and processed to test samples, 2.5 mm thick. The material contains 0.8% of tin in the form of oxide and 12.5% of diphenylether-bound bromine. The UL 94 test gives the test result V-2.

EXAMPLE 4

200.0 g of octabromodiphenylether (particles size <100 μm) are added to 0.4 l of water. The suspension heated to 80° C. is thereupon simultaneously mixed in 1 h with a solution of 48.8 g of tin(IV)-chloride in a mixture of 97.1 ml of water and 21.0 g of concentrated hydrochloric acid (37%) as well as 119.2 g of sodium hydroxide solution (32%) such that the pH of 4 remains unchanged.

The subsequent reaction (with a pH of 4.5) and working-up take place as in Example 1, only the subsequent drying takes place for 5 h at 150° C. The tin content of the finished preparation is determined at 8.0%. It is predominantly present as tin(IV)-oxide on the surface of the octabromodiphenylether.

In order to test the flameproofing effect of the above-described carrier preparation, 267.0 g are incorporated in 1033.0 g of a typical ABS copolymer (Novodur PX) on a kneading machine at from 200° to 220° C. and processed to test samples 2.5 mm thick. It contains 1.6% of tin in the form of oxide and 14.7% of diphenylether-bound bromine. The UL 94 test gives the test result V-0.

EXAMPLE 5

200.0 g of octabromodiphenylether (particle size <100 μm) are added to 0.5 l of water. The suspension heated to 80° C. is thereupon simultaneously mixed in 1 h with a solution of 30.9 g of bismuth nitrate, Bi(NO$_3$)$_3$.5H$_2$O, in a mixture of 73.4 ml of water and 43.7 g of concentrated hydrochloric acid as well as 71.2% of sodium hydroxide solution (32%) such that the pH of 7 remains unchanged.

The subsequent reaction (with a pH of 7.5) and working-up take place as in Example 1, only the subsequent drying takes place for 5 h at 150° C. The bismuth content of the finished preparation is determined at 4.6%. It is predominantly present as bismuth(III)-oxide on the surface of the octabromodiphenylether.

In order to test the flameproofing effect of the above-described carrier preparation, 260.0 g are incorporated in 1040.0 g of a typical ABS copolymer (Novodur PX) on a kneading machine at from 200° to 220° C. and processed to test samples, 2.5 mm thick. It contains 1.0% of bismuth in the form of oxide and 15.1% of diphenylether-bound bromine. The UL 94 test gives the test result V-0.

COMPARATIVE EXAMPLES

If 195 or 234 g of octa- or decabromodiphenylether are mixed with 1105 or 1066 g of ABS copolymer (Novodur PX) to produce a homogeneous material and are tested in a fire test, the UL 94 test is not passed.

If, on the other hand, 1040 or 1001 g of ABS copolymer, 65 g, that is 5% by weight, of antimony(III)-oxide, tin(IV)-oxide or bismuth(III)-oxide and 195 or 234 g of octa- or decabromodiphenylether (test samples 2.5 mm thick) are added, the assessment V-0 according to UL 94 is made to these materials in both antimony(III)-oxide cases and in the bismuth(III)-oxide case with decabromodiphenylether. The assessment is V-2 according to UL 94 in the three other cases. However, they have the clearly higher metal content of greater than 4%.

We claim:

1. A finely-divided metal oxide-containing preparation, in which preparation one or more metal oxides in a quantity of from 2 to 20% by weight based on the total quantity, is present as surface covering on an organic, halogen-containing carrier material.

2. A finely-divided metal oxide-containing preparation, in which preparation as metal oxide antimony(III)-oxide, tin(IV)-oxide or bismuth(III)-oxide or a mixture thereof in a quantity of from 2 to 20% by weight, based on the total quantity, is present as surface covering on an organic, halogen-containing carrier material.

3. A preparation according to claim 1, in which preparation the carrier material is hexabromocyclododecane, octabromodiphenyl, decabromodiphenyl, octabromodiphenylether, decabromodiphenylether, hexabromobisphenoxyethane, ethylene bistetrabromophthalimide, as well as a mixture thereof.

4. A process for the production of the preparation according to claim 1, in which preparation an organic, halogen-containing carrier material is suspended in water, a metal compound or a mixture thereof is added in the form of an acidic solution, the mixture is neutralized and the solid preparation is separated, washed and dried.

5. Plastics materials containing from 3 to 25% by weight of the preparation according to any of claims 1 to 3 as flame proofing agents.

6. Polyethylene, polypropylene, polyamide, polyester, polycarbonate, polyurethane, polyphenylene oxide, polystyrene and copolymers with styrene (SAN, ABS) or mixtures thereof or hardened unsaturated polyesters or epoxide resins or cross-linked polyurethanes containing from 3 to 25% by weight of the preparation according to any of claims 1 to 3 as flameproofing agents.

7. Plastics materials according to claim 5, additionally containing further halogen-containing compounds, fillers and pigments.

8. Plastics materials according to claim 6 additionally containing further halogen-containing compounds, fillers and pigments.

* * * * *